United States Patent
Yocam et al.

(10) Patent No.: US 9,560,481 B1
(45) Date of Patent: Jan. 31, 2017

(54) ESTABLISHING GEO-FENCES AND RELATED ALARMS

(71) Applicant: T-Mobile USA, Inc., Bellevue, WA (US)

(72) Inventors: Eric Yocam, Sammamish, WA (US); Andrew Watts, Seattle, WA (US)

(73) Assignee: T-Mobile U.S.A, Inc., Bellevue, WA (US)

( * ) Notice: Subject to any disclaimer, the term of this patent is extended or adjusted under 35 U.S.C. 154(b) by 0 days.

(21) Appl. No.: 14/826,592

(22) Filed: Aug. 14, 2015

(51) Int. Cl.
  *H04W 64/00* (2009.01)
  *H04W 4/02* (2009.01)
  *H04W 52/02* (2009.01)

(52) U.S. Cl.
  CPC ......... *H04W 4/021* (2013.01); *H04W 52/0254* (2013.01)

(58) Field of Classification Search
  CPC .............................. H04W 4/021; H04W 64/00
  USPC ............................................ 455/456.1–456.6
  See application file for complete search history.

(56) References Cited

U.S. PATENT DOCUMENTS

| | | | | |
|---|---|---|---|---|
| 8,284,748 | B2* | 10/2012 | Borghei | H04W 4/08 370/252 |
| 8,378,813 | B2* | 2/2013 | Bannard | G08B 21/24 235/380 |
| 8,977,296 | B1 | 3/2015 | Briggs et al. | |
| 9,078,098 | B1 | 7/2015 | Cronin | |
| 2014/0269643 | A1* | 9/2014 | Sun | H04W 52/0229 370/338 |
| 2015/0163631 | A1 | 6/2015 | Quam et al. | |

\* cited by examiner

*Primary Examiner* — Michael T Vu

(74) *Attorney, Agent, or Firm* — Han Santos Reich, PLLC; Gabriel Daniel

(57) ABSTRACT

System and method of geo-fencing. A user equipment (UE) defines a geo-fence for an asset by tracking location coordinates of the UE with at least one sensor element, as the UE is moved around a perimeter of an area. The location coordinates of the geo-fence are transferred to a location aware device (LAD) attached to the asset. Upon determining, by the at least one sensor, that the LAD crossed the geo-fence, a notification is sent to a warning server operative to trigger a warning message to one or more recipients.

16 Claims, 6 Drawing Sheets

ESTABLISHING GEO-FENCES AND RELATED ALARMS

BACKGROUND

Geo-fencing is a technology that provides a virtual barrier around a geographic area and can be used for security purposes. Geo-fencing was initially developed for tracking assets within a predefined geographic region (i.e., the geo-fence). When the virtual barrier is crossed by a sensor, it may trigger a message that may be received by a computing device, in the form of an alert, such that appropriate action is taken.

There are services that allow subscribers to go to a web page and draw a geo-fence around their business or home on a map or a satellite image thereof. An alarm is triggered if the geo-fence is crossed by a sensor. However, these maps and images may be outdated and generally do not provide a real and interactive environment to create a multidimensional geo-fence. It is with respect to these considerations and others that the present disclosure has been written.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to geo-fences and more particularly to geo-fences that trigger a warning when they are crossed. In one embodiment, a geo-fence system includes user equipment in the form of a mobile device that is configured to define a geo-fence for an asset to be protected (or to be kept) outside the geo-fence. The geo-fence is determined by moving the user equipment around a perimeter of an area. This information is transferred to a sensor that is location aware. When the geo-fence is crossed by the location aware device attached to the asset, a notification is sent to a server. The server provides a warning based on previously identified preferences to one or more recipients. In one embodiment, a separate user equipment is not required. Instead, the location aware device performs all the geo-fencing functions and communication to the warning server.

The techniques described herein may be implemented in a number of ways. Example implementations are provided below with reference to the following figures.

Example Network Architecture

Figure 1:
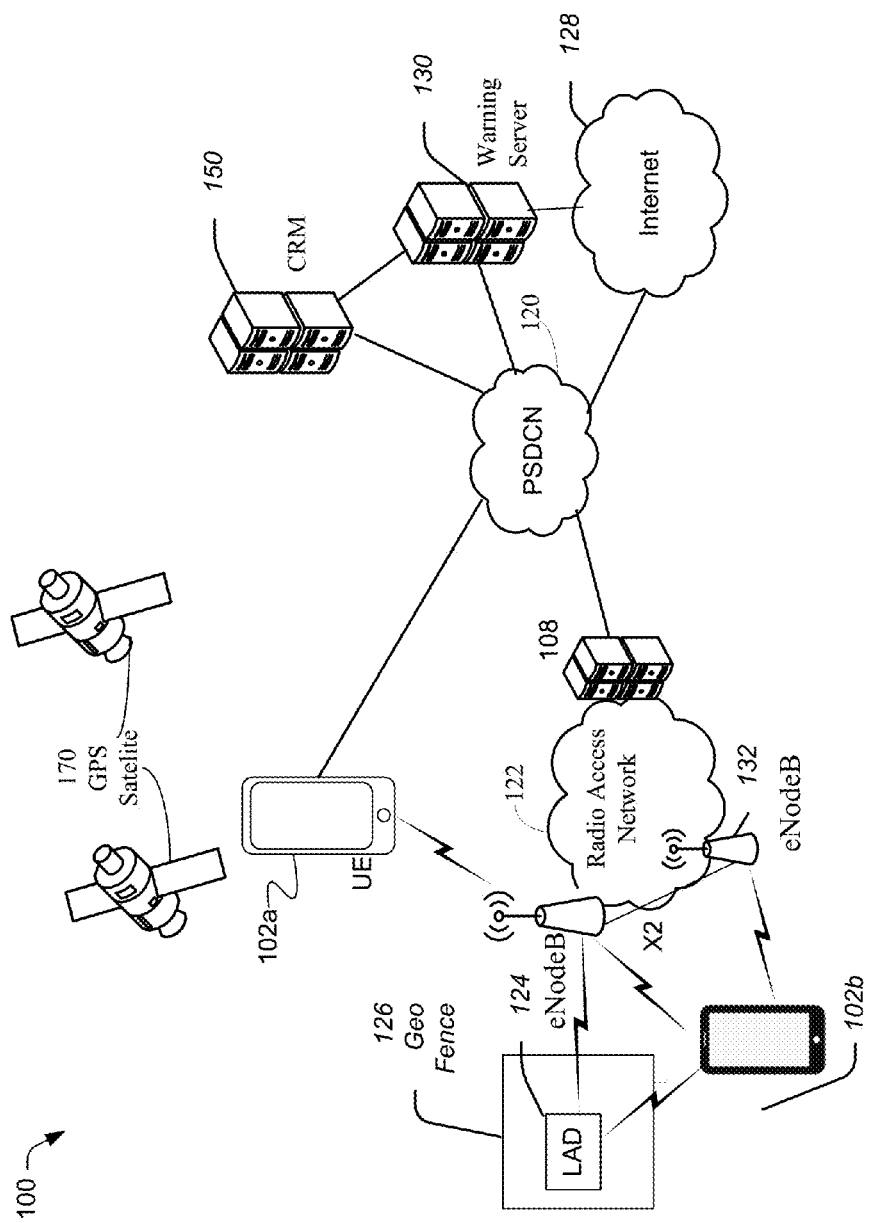
FIG. 1 illustrates an example architecture for implementing a geo-fence system and triggering an alarm when predetermined conditions are met.

FIG. 1 illustrates an example architecture for implementing a geo-fence system and triggering an alarm when one or more predetermined conditions are met. FIG. 1 illustrates a mobile communication network 100 as may be operated by a carrier or service provider to provide a wide range of mobile communication services and ancillary services or features to its subscriber customers and associated mobile device users. The elements generally indicated by the reference numeral 100 are elements of the mobile communication network and are operated by or on behalf of the carrier. The mobile communication network 100 provides communications between various user equipment (UE), such as 102*a* and 102*b*, as well as communications for the UE with networks and stations outside the mobile communication network 100.

For purposes of later discussion, several UE's appear in the drawing, to represent some examples of the devices that may receive various services via the radio access network 122. Today, UE's typically take the form of portable handsets, smart-phones, tablet computers, personal digital assistants (PDAs), and smart watches, although they may be implemented in other form factors, including consumer, business, and medical electronic devices. Each mobile device (i.e., 102*a* and 102*b*) may include a Global Positioning System (GPS) receiver that receives and processes signals from GPS satellites (e.g., 170 in FIG. 1) to determine its geographic location, as well as other sensors that provide one or more functions, including the functions to provide a geo-fence for an asset therein (or outside thereof).

GPS provides accurate position information in locations where the mobile device can receive the signals from the GPS satellites. In one embodiment, the space-based satellite navigation system of GLONASS is used to add more satellites, and thereby more quickly and accurately establish the location of the UE. In locations where GPS may not be available or where additional accuracy is appropriate, for example, in buildings where a UE may be unable to receive enough different satellite signals to obtain a position fix, the mobile device might utilize other location techniques. Although not shown, if beacons are provided in a building, e.g., utilizing Bluetooth or WiFi frequencies, the mobile device may receive signals from a number of the beacons. Identification of beacons from which the device receives signals and measured signal strengths could then be processed (e.g., with the help of a server) to track the location of the UE within a building to establish a geo-fence and to identify when it is breached.

The mobile communication network 100 provides communication for UE 102*a* and 102*b*, as well as for mobile devices that do not participate in the geo-fence and notification system described herein. Network 100 allows users of the UE's (e.g., customers or subscribers to the radio access network 122) to initiate communication, and receive information from the packet switched data communication network 120.

The mobile communication network 100 typically is implemented by a number of interconnected networks. Hence, the overall communication network 100 may include a number of Radio Access Networks (RANs) 122, as well as regional ground networks interconnecting a number of RANs and a wide area network (WAN) interconnecting the regional ground networks to core network elements, such as the Multimedia Messaging Service Centers (MMSCs). A regional portion of the network 100, such as that serving UE's 102b and 102b may include one or more RANs (represented by the radio access network 122) and a regional circuit and/or packet switched network and associated signaling network facilities.

Physical elements of a RAN 122, operated by one of the mobile service providers or carriers, include a number of base stations represented in the example of FIG. 1 by an eNodeB 132 node. Such eNodeB 132 nodes may include a base transceiver system (BTS) that communicates via an antennae system at the site of the node and over the air-link with one or more of the UE's (102a to 102c) when the UE's are within range. Each eNodeB 132 node may include a BTS coupled to several antennae mounted on a radio tower within a coverage area often referred to as a "cell." The BTS is the part of the radio network that sends and receives RF signals to/from the UE's that the eNodeB node 132 currently serves.

The radio access network 122 carries the user communications for the UE's between the respective eNodeB 132 nodes and other elements with or through which the UE's communicate. Individual elements such as switches and/or routers forming the radio access network 122 are omitted here for simplicity.

In one embodiment, the base stations (eNodeB's) may be used instead or in addition to the GPS sensors in order to determine the location of the UE. To that end, multilateration and/or triangulation may be used. Cellular multilateration is a technique based on measuring the difference in distance in which two known cell towers locations (i.e., eNodeB's) receive a signal from a UE at an unknown location. There are an endless number of potential locations based on distance measurements alone, but when the points are plotted together, they form a hyperbolic curve. To determine where the UE lies along the curve, measurements are taken again, but this time with a different set of cellular towers. The second hyperbolic curve produced should intercept the first curve at certain points, producing a small number of possible locations for the UE that is defining the geo-fence.

Multilateration executed in urban areas, where cell towers are abundant, is more likely to produce a more precise result, whereas multilateration carried out in rural areas, where cell towers are miles away from each other, will result in a significantly less precise reading, which may still be sufficient for a coarse geo-fence.

Cellular triangulation also uses cell towers (i.e., eNodeB's) to track the location of a UE, but instead of measuring distances, triangulation measures the angles to the lost device from the ends of a baseline (in this case, the two cell towers act as the "ends", and the baseline is the line connecting the two cell towers). When the necessary angles are known, two lines from each tower can be drawn out at the specified angles until the lines cross, forming a triangle. The point at which the lines cross represents the approximate location of the lost phone. Triangulation may be faster than multilateration since only one set of measurements is needed instead of two, and only two cell towers are required instead of four.

By tracking and recording a position of the UE as it is moved around an area of any shape, a geo-fence 126 can be defined by the UE.

It will be understood that the various network elements can communicate with each other, as well as other aspects of the radio access network 122, and other networks (e.g., the public switched telephone network (not shown) and the Internet 128) either directly or indirectly.

The service provider of the radio access network 122 may also operate a number of systems that provide ancillary functions in support of the communications services and/or application services provided through the radio access network 122, and those elements communicate with other nodes or elements of the radio access network 122, such as one or more private IP type packet data networks 120 based on a packet data communication network (PDCN), sometimes referred to as an Intranet, (i.e., a private network).

Generally, such systems are part of, or connected for, communication via the private network 120 and may provide additional services such as a customer relationship manager (CRM) 150, which may be coupled for communication via the private network 120. In one example, the CRM server 150 offers its account holders (e.g., user of a UE and/or the geo-fencing service) on-line access to a variety of functions related to the account holders' account, such as on-line payment information, subscription changes, where the alert information is to be provided (e.g., to the UE, e-mail, police, caretaker, etc.), password control, and the like. The CRM server 150 may include subscription related information about the geo-fencing service (e.g., what the account holder preferences are). The CRM server 150 may provide the user an interface via the Internet 128. Hence, a user's terminal, such as PC (not shown), may be used to access on-line information about a UE's user's account, which the radio access network carrier makes available via the carrier's web site, accessible through the Internet 128.

In one embodiment, there is a warning server 130 that is configured to provide warning information to one or more recipients that are identified in the account information stored in the CRM 150. For example, when a location aware device (LAD) 124 crosses the geo-fence 126 that was previously created by a UE (e.g., by walking around a boundary of the desired geo-fence 126), the LAD 124 sends a notification of the event through the radio access network 122 and PSDCN to the warning server 130. In various embodiments, the warning server 130 may then warn the appropriate recipient(s) based on previously stored user preferences in the CRM 150 or the recipient identified in the notification from the LAD 124. While the warning server and the CRM 150 are illustrated by way of example as two separate servers, they may be implemented on a single hardware platform (e.g., one server).

Of note for purposes of this discussion, the alerts received by the warning server 130 from the LAD 124, and the warning(s) received the recipients, may be via the radio access network 122. For example, the Evolved Packet Core (EPC) of the radio access network 122 uses the concept of Evolved Packet System (EPS) bearer channels to route IP traffic from a gateway 108 in the radio access network 122 to a UE. A bearer channel is an IP packet flow with a defined quality of service (QoS) between the Packet Data Network (PDN) Gateway (PGW) 108 and the UE (e.g., 102a, 102b), as well as LAD 124. The eNodeBs 132 are normally interconnected with each other by an interface known as "X2."

Figure 2:
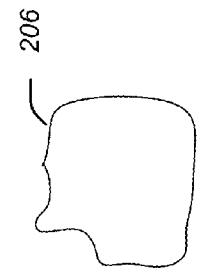
FIG. 2 illustrates different geo boundaries, consistent with various exemplary embodiments.
Figure 2:
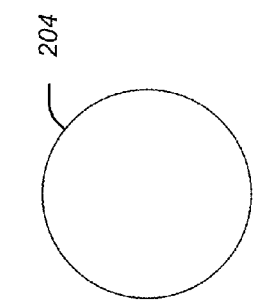
Figure 2:
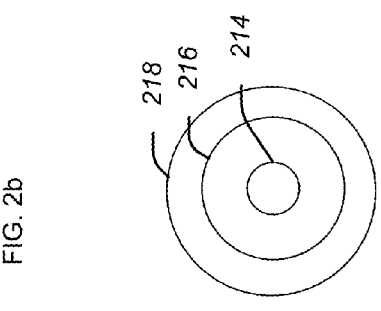
Figure 2:
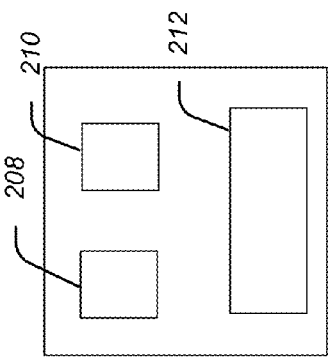
Figure 2:
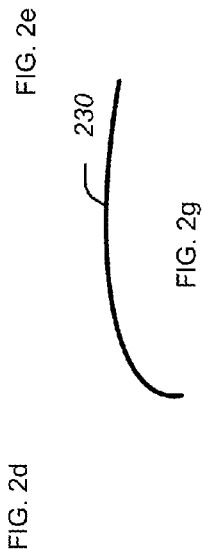
Figure 2:
Figure 2:

FIG. 2 illustrates different geo boundaries, consistent with various exemplary embodiments. The geo-fence 126 may be two or three dimensional. The geo-fence 126 may have different shapes, such as rectangular (e.g., 202, FIG. 2a), circular (e.g., 204, FIG. 2b), and be of an irregular shape (e.g., 206, FIG. 2c), etc. Further, there may be a network of geo-fences covering different regions 208, 210, 212, as illustrated in FIG. 2d. In various embodiments, each region 208, 210, and 212), may have different significance and generate a different warning to its recipient when it is crossed, based on the preferences identified in the warning server 130. For example, geo-fence 208 may represent a mild alert, where UE 102a is notified via text, e-mail, voice-call, etc., indicating that the geo-fence 208 has been breached (i.e., crossed). In contrast, geo-fence 212 may represent a high security area and may generate a severe alert on a display of the UE and/or to an emergency response service.

In one embodiment, the geo-fences may be nested 214, 216, and 218, as illustrated in FIG. 2e, where each region represents a different type of warning that may be generated to its recipient. Further, the geo-fences may overlap (220, 222), as illustrated in FIG. 2f. In various embodiments, a first type of warning may be generated when geo-fence 220 is crossed; a second type of warning may be generated when geo-fence 222 is crossed; and both first and second type of warnings are generated when both geo-fences 220 and 222 are crossed. In one embodiment, the same type of warning is generated, regardless of the region (e.g., 220 or 222) crossed.

The geo-fences discussed herein may be positive or negative geo-fences (e.g., may trigger a warning when they are entered and/or are left). In one embodiment, the warning is removed when a LAD reenters or leaves the geo-fence.

While the boundaries that are illustrated herein are closed (i.e., the start and end point are the same) it will be understood that a fence may have a start point that is different to its end point (e.g., be open ended), as illustrated by geo-fence 230 in FIG. 2g.

In various embodiments, the geo-fences discussed herein may be activated or deactivated when one or more predetermined conditions are met. For example, geo-fence 208 may be active for a first predetermined time, geo-fence 210 may be active a second predetermined time, and geo-fence 3 may be active a third predetermined time. In one embodiment, the predetermined criteria for the activation and deactivation of the fences, the corresponding warnings, and other preferences may be stored in CRM 150 via instructions from the UE (e.g., 102b) or an alternate computing device (not shown) over a WEB page of the CRM over the internet 128.

A geo-fence can be created in different ways. For example, a user of the handheld device UE 102b, may activate an application (e.g., geo-fence application) on the UE 102b that is operative to determine a position of the UE 102b and record it in its memory. In various embodiments, the location coordinates are recorded continuously or at predetermined time or distance intervals, as the UE 102b is moved to create a geo-fence to enclose (or to keep out) an asset that is being protected. For example, the UE 102b may receive a "start" point of where the geo-fence is to be created and an "end" point where the geo-fence ends. In one embodiment, the application indicates on a display of the UE 102b that the perimeter is complete (e.g., the start point is within a threshold distance since the geo-fence has been started), thereby automatically completing the geo-fence.

The user of the UE 102b may simply walk with the UE 102b around the perimeter of the geo-fence that s/he would like to create. If larger distances are to be covered, the user can use other forms of transportation, such as a bike or vehicle, to create the geo-fence. In one embodiment, the UE 102b may be in the form of (or mounted on a) drone, to create a two or three dimensional geo-fence.

In one embodiment the geo-fence app on the UE 102b allows the user to identify the type of warning to be generated when a geo-fence is breached, and/or the appropriate recipient. In another embodiment, notification preferences are previously stored in the CRM 150 as general preferences for warnings for triggered events. When the type of warning and recipient thereof is not specified by the geo-fence app, the warning server 130 defaults to the warning and recipients stored in the CRM 150.

In one embodiment, the geo-fence information may be transferred to a sensor, referred to herein as the LAD 124. The LAD 124 may be attached to an asset that the user of the UE is trying to protect (or keep out of the one or more geo-fences created).

In various embodiments, the UE 102b communicates directly with the LAD 124 through one or more short range wireless transceivers or with a cellular transceiver over the radio access network 122. In one embodiment, the UE 102b may be coupled directly (e.g., connected electrically) with the LAD 124 during the transfer of the geo-fence information.

The various wireless technologies to communicate with the LAD 124 include (but are not limited to) Digital Enhanced Cordless Telecommunications (DECT), Near Field Communication (NFC), ZigBee, and Bluetooth. DECT technology (traditionally used for wireless home phone systems) uses substantially less energy than cellular systems. NFC is a set of standards for smart-phones and similar devices to establish radio communication with each other by touching them together or bringing them into close proximity, usually no more than a few centimeters. Since the range is small, there are substantial power consumption benefits. Bluetooth, while operating at longer distances than NFC, still saves a substantial amount of power compared to cellular systems. ZigBee is a low-cost, low-power, wireless mesh network standard. The mesh networking of ZigBee provides high reliability and more extensive range. Generally, low power-usage allows longer life and smaller batteries, providing for more ergonomic form factors of the LAD 124 and/or longer operation. For example, the LAD 124 can be attached to an asset to be protected, such as a child, a bicycle, or concealed behind a painting, etc.

In various embodiments, the LAD 124 may be part of a system of LADs. For example, in order to provide recognition information of the asset (e.g., a bicycle) attached to the LAD 124, the UE 102b may take a picture of the asset and transfer the picture to the LAD 124. In various embodiments, the transfer of the picture may occur at the same time that the tracking information is transferred to the LAD 124 or at another time. In one embodiment, the LAD 124 is equipped with a camera and the LAD 124 itself is used to take a picture of the asset. In this regard, a transfer of the picture to the LAD 124 is not required.

In one embodiment, the one or more geo-fence coordinates, the picture taken of the asset, and/or warning preferences, collectively referred to herein as the tracking information, are sent to the warning server 130 over the radio access network 122. In various embodiments, tracking information may be sent to the warning server 130 by the UE 102b or the LAD 124 over the radio access network 122. The picture of the asset stored in the CRM 150 may be accessed by the warning server 130 during an event (e.g., triggered by one or more geo-fences being crossed) and sent to the appropriate recipient identified in the user account stored in the CRM 150. Accordingly, the recipient may receive at least one of the following: a warning that the asset was moved beyond the predetermined geo-fence; a time of the breach;

the last location of the asset (e.g., GPS coordinates as to where on the geo-fence the breach occurred); a live location of the asset (e.g., streamed from the LAD 124); and a picture of the asset.

The warning server 130 may warn the appropriate recipient(s) in response to a trigger event (i.e., crossing of the geo-fence) based on previously stored user preferences in the CRM 150 and/or the instructions received from the alert (e.g., event notification) of the LAD 124. For example, upon the warning server learning of a triggering event (i.e., where one or more geo-fences are crossed) the warning server 130 may determine whether instructions are included in the alert as to the type of warning to generate and the recipient thereof. If such information is not provided, the warning server may contact the CRM 150 to determine the general preferences previously stored in a memory of the CRM 150 and route the warning accordingly (e.g., via text, e-mail, voice-call, etc.).

In one embodiment, the LAD 124 is more sophisticated and configured to perform the functions of creating the geo-fence, taking a picture of the asset, and/or providing preferences discussed herein to the warning server 130. Put differently, in this embodiment, a separate UE is not necessary during the geo-fence setup stage. For example, instead of moving a separate UE around the periphery of a geo-fence, taking a picture of the asset, and later transferring the tracking information to the LAD 124, the LAD 124 itself may perform the defining the geo-fence and taking the picture functions.

In one embodiment, the geo-fence boundary is determined by the LAD 124 by specifying a radius from its present location. Put differently, moving the LAD around the periphery of the geo-fence is not required. Instead, a radius is specified on the user interface of the LAD based on its present location.

Example User Equipment Components

Figure 3:
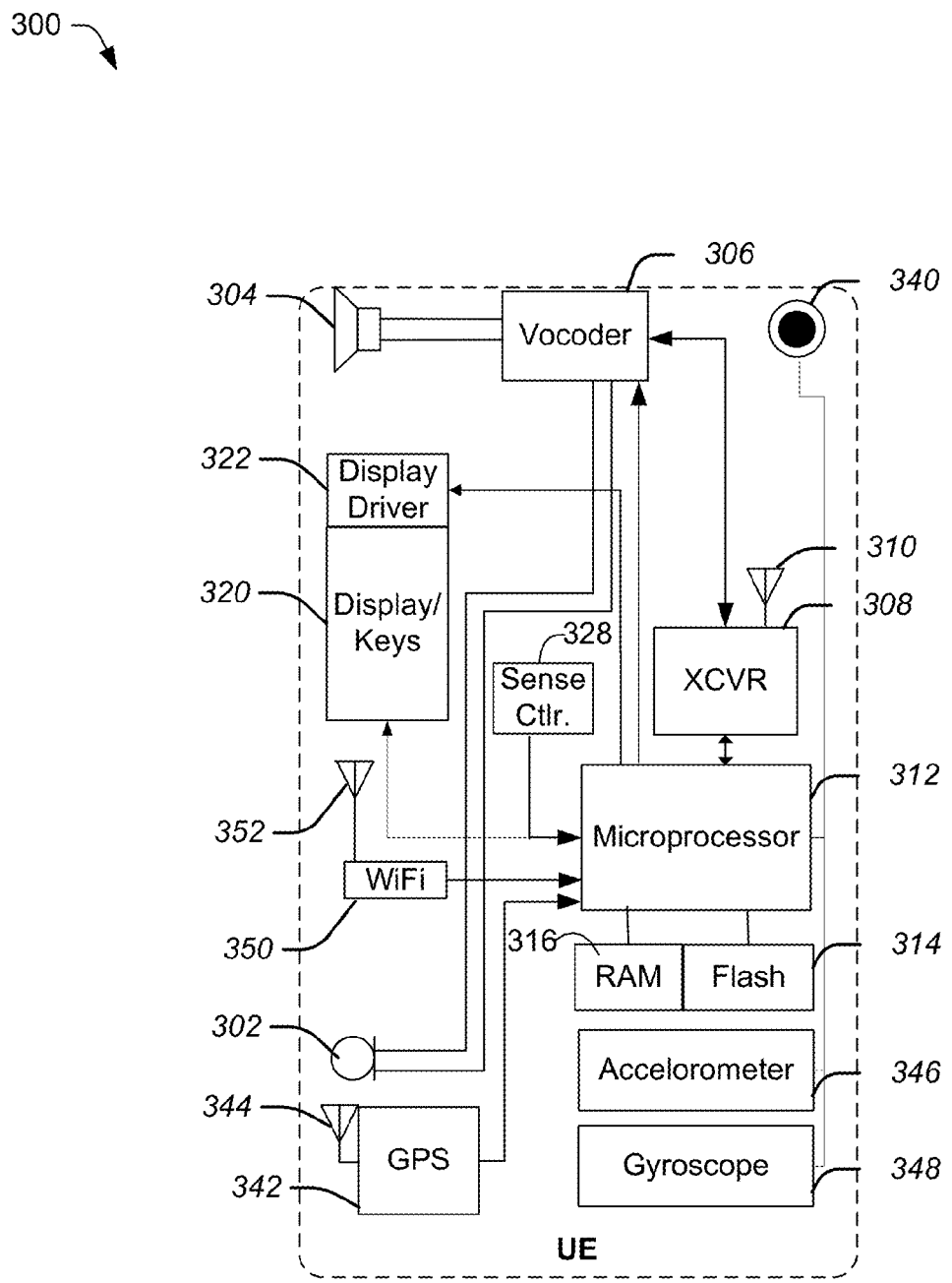
FIG. 3 is a block diagram showing various components of an illustrative user equipment that supports creating a geo-fence and interacting with a location aware device.

FIG. 3 is a block diagram showing various components of an illustrative user equipment (UE) that supports creating a geo-fence and receiving messages from the warning server.

As discussed in the context of FIGS. 1 and 2 above, the geo-fence and warning system discussed herein involves an interaction with an appropriately configured UE. It may be useful to consider the functional elements/aspects of an exemplary UE, at a high-level. For purposes of such a discussion, FIG. 3 provides a block diagram illustration of an exemplary UE 300. Although the UE 300 may be a handset type mobile phone or may be incorporated into another device, such as a personal digital assistant (PDA), a tablet computer, or the like. For discussion purposes, the illustration shows the UE 300 in the form of a handheld smart-phone.

The smart-phone example of the UE 300 may function as a normal digital wireless telephone station. For that function, the UE 300 includes a microphone 302 for audio signal input and a speaker 104 for audio signal output. The microphone 302 and speaker 304 connect to voice coding and decoding circuitry (vocoder) 306. For a voice telephone call, for example, the vocoder 306 provides two-way conversion between analog audio signals representing speech or other audio and digital samples at a compressed bit rate compatible with the digital protocol of wireless telephone network communications through radio access network 122 and possibly voice over packet (Internet Protocol) communications if supported by the UE 300 and the data services through the radio access network 122.

For digital wireless communications, the UE 300 also includes at least one digital transceiver (XCVR) 308. The XCVR 308 could be a multimode transceiver, or the UE 300 may include two or more transceivers each of which supports a subset of the various technologies or modes. The concepts discussed herein encompass examples of the UE 300 utilizing any digital transceivers that conform to current or future developed digital wireless communication standards.

The transceiver 308 provides two-way wireless communication of information, such as vocoded speech samples and/or digital message information, in accordance with the technology of the radio access network 122. In this case, the transceiver 308 also sends and receives a variety of signaling messages in support of the various voice and data services provided via the UE 300 and the communication network. Each transceiver 308 connects through RF send and receive amplifiers (not separately shown) to an antenna 310. In the example of FIG. 3, the transceiver 308 is configured for RF communication in accord with a digital wireless protocol, such as the CDMA and 3GPP protocols.

The UE 300 includes a display 320 with a touch screen for displaying messages, receiving warnings from the warning server 130, or the like, as well as call related information dialed by the user, calling party numbers, etc. The display 320 is driven by a display driver 322 that receives its instructions from the microprocessor 312. A sense controller 328 senses signals from elements of the touch sensor of the display 320 and detects an occurrence and position of each touch of the screen formed by the touch sensitive display 320. The sense circuit 328 provides touch position information to the microprocessor 312, which correlates that information to the information currently displayed via the touch sensitive display 320, to determine the nature of user input via the screen.

The touch sensitive display (that may be configured to display one or more touch keys) are the physical elements providing the textual and graphical user interface for the UE 300. The microphone 302 and speaker 304 may be used as additional user interface elements, for audio input and output.

As discussed above, the UE 300 may also include one or more digital cameras 340, for capturing still images and/or video clips, as well as taking a picture of an asset to better identify the asset when it has crossed a geo-fence.

The UE 300 may also include a GPS receiver 342 for communicating with GPS satellites via antenna 344. The GPS sensor 342 enables the UE to determine its three-dimensional (3D) geographic location. For example, the GPS receiver 342 obtains time of flight measurements based on signals received from three of more satellites of the GPS constellation. Based on identification of the satellites from which the signals were received and known positions of the satellites, a processor (in the mobile device or in a server) determines the geographic position of the UE 300.

The UE 300 may also include a haptic element (not shown) to provide haptic feedback to the user (e.g., as a warning that a LAD has crossed a geo-fence). Various combinations of the touch sensitive display 320, microphone 302, haptic element, and speaker 304 may be used as the physical input output elements of the graphical user interface (GUI), for multimedia (e.g., audio and/or video) communications. Of course other user interface elements may be used, such as a stylus and touch sensitive display screen, as in a PDA, tablet computer, or smart phone. In addition to normal telephone and data communication related input/output (including message input and message display functions), the user interface elements also may be used for display of notifications and other information to the user and user input of selections, for example, including those indicating that a geo-fence has been breached.

Additional sensors, such as an accelerometer, gyroscope, and compass may also be included in the UE 300. For example, the combination of sensor information helps determine the position of the UE in order to establish an accurate geo-fence with appropriate resolution to protect an asset that has an LAD attached thereto.

The gyroscope 348 provides an extension of location and direction. For example, it provides the UE 300 an increased awareness of its position in relation to the physical surroundings (e.g., direction and orientation) during the determination of the geo-fence.

An accelerometer 346 may be used to determine the orientation in which the UE 300 is being moved, as well as the speed of movement. Information from the accelerometer 346 may help a processor of the UE 300 characterize the physical movements of the UE 300 to accurately establish a geo-fence.

In the example of FIG. 3, a microprocessor 112 serves as a programmable controller or processor, in that it controls all operations of the UE 300 in accord with programming that it executes, for all normal operations, and for operations involved in running one or more application programs to establish a geo-fence and receiving warning information from the warning server 130, and providing warning information to the user, as discussed herein. In the example of FIG. 3, the UE 300 includes flash type program memory 314, for storage of various "software" or "firmware" program routines and mobile configuration settings, such as mobile telephone number (MTN or MDN), etc. The UE 300 may also include a non-volatile random access memory (RAM) 316 for a working data processing memory. In a present implementation, the flash type program memory 314 stores firmware such as a boot routine, device driver software, an operating system, call processing software and vocoder control software, and any of a wide variety of other applications, such as client browser software and short message service software.

The memories 314 and 316 also store various data, such as telephone numbers and server addresses, downloaded data such as multimedia content, and various data input by the user. Programming stored in the flash type program memory 314, sometimes referred to as "firmware," is loaded into and executed by the microprocessor 312. Accordingly, the UE 300 includes a processor, and programming stored in the flash memory 314 configures the processor so that the UE is capable of performing various desired functions, including creating a geo-fence, providing warning preferences to the CRM 150, receiving warning messages from the warning server 130, and communicating the warning message to a user via the display 320.

In one embodiment, for packet data communications, the exemplary UE 300 may also include a Wi-Fi transceiver 350 and associated antenna 352. Although Wi-Fi is used here by way of example, the transceiver 350 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 350, for example, may provide two-way data transport for wireless communication with a wireless access point in a residence or enterprise that the user frequents or with any available hotspot offered in a public venue. Although communicating through a different network or networks, the transceiver 350 supports various types of data communications similar to the packet data communications supported via the mobile network transceiver 308, including, in one embodiment, communications related to transactions involving data transmitted via NFC to a LAD.

In one embodiment, where tighter granularity is desired than GPS or cell tower triangulation, Wi-Fi triangulation may be used, sometimes referred to as a Wi-Fi based positioning system (WPS). Such location determination is particularly useful in indoor settings, although outdoor implementations are contemplated as well. For example, WP can be used where GPS is not appropriate due to the blockage of the GPS satellite 170 signal. In one embodiment, better granularity of the location determination for geo-fence purposes may be provided. The location determination used for positioning with wireless access points is based on measuring the intensity of the received signal strength (RSS). For example, multilateration using many Wi-Fi receivers may be combined with calibration measurements ("fingerprinting") to improve accuracy.

In various embodiments, depending on the resolution and features desired, the LAD discussed herein may include some or all of the features of the UE 300 discussed above. For example, a simple LAD may exclude the interactive display 320, display driver 321, sense controller 328, camera 340, microphone 302, accelerometer 346, and gyroscope 348. Instead, the relevant information is provided by the UE 300 to the LAD. However, in a more sophisticated implementation, one or more of the excluded features are included to provide additional functionality and more independence to the LAD. As discussed above, in one embodiment, the LAD is configured as the UE 300 and can therefore itself perform the functions of creating a geo-fence, taking a picture of the asset, etc., thereby offering a platform that is independent of the UE for such purposes.

Example Processes

Figure 4:
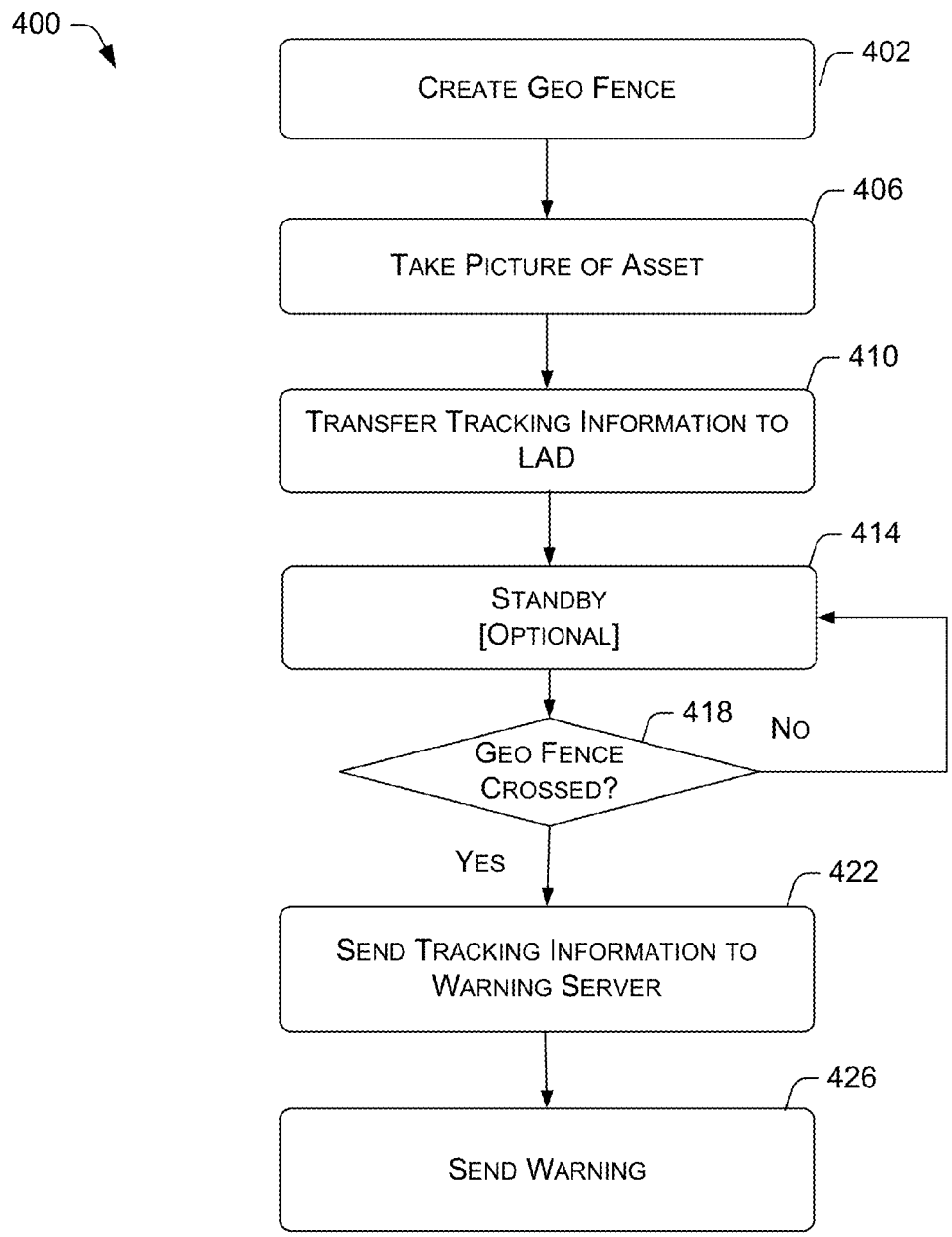
FIG. 4 is a flow diagram of an example process for geo-fencing with a User Equipment (UE) and a separate Location Aware Device (LAD).
Figure 5:
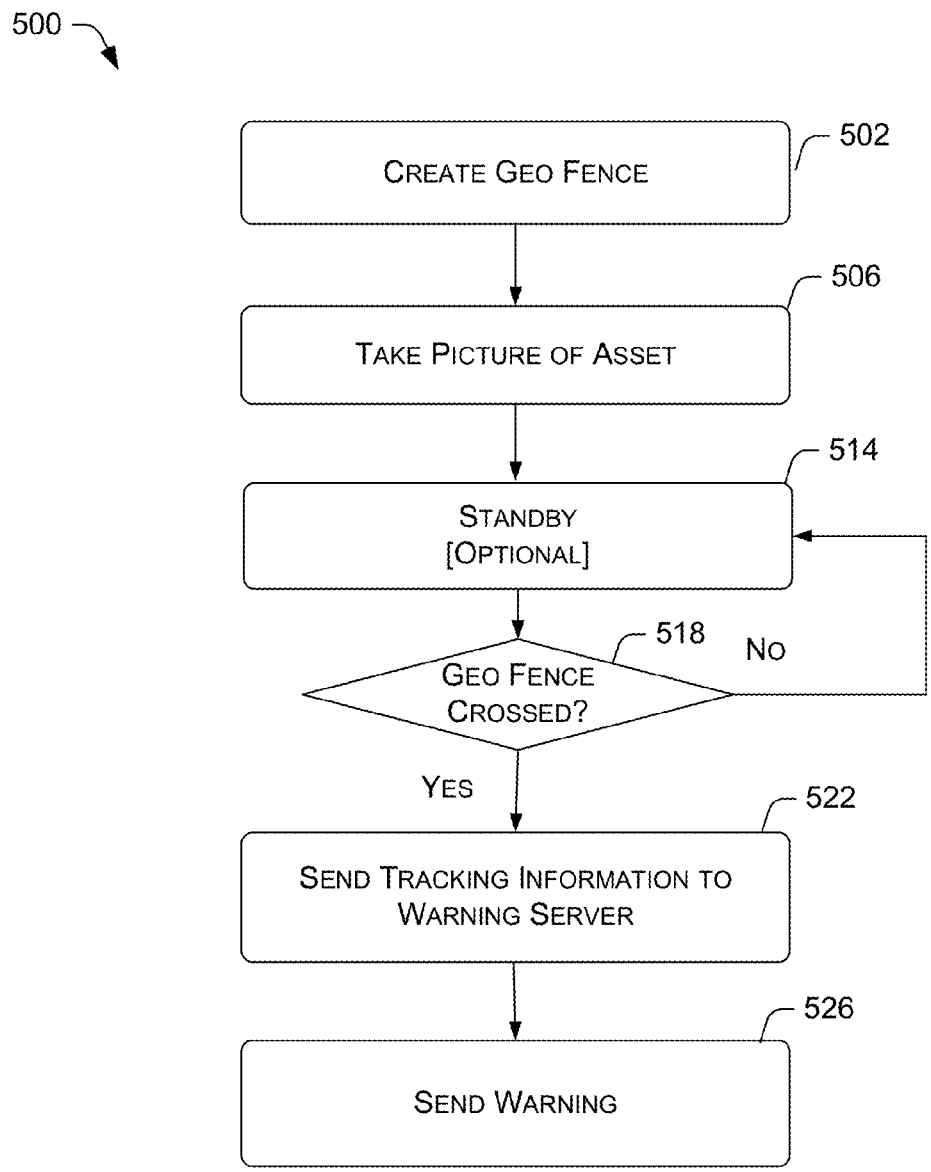
FIG. 5 is a flow diagram of an example process for geo-fencing with an LAD without a separate UE.

With the foregoing overview of the system 100 and the various components of the UE and LAD, it may be helpful now to consider high-level discussions of example processes. To that end, FIGS. 4-5 present illustrative processes 400-500 for geo-fencing. Each of the processes 400-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to the architecture 100 of FIG. 1.

FIG. 4 is a flow diagram of an example process for geo-fencing with a UE and a separate LAD. At block 402, a geo-fence is created. To that end, an application on the UE is activated that is operative to determine a position of the UE and record it in the memory of the UE (e.g., RAM or Flash). In various embodiments, the location coordinates may be recorded continuously or at specified time or distance intervals, as the UE is moved around a perimeter of the geo-fence to be created. This geo-fence may indicate when an LAD crosses the geo-fence (e.g., goes out or inside the geo-fence).

At block 406, contextual information may be provided. For example, a picture may be taken via the UE of an asset to be monitored. Further, the warning preferences may be identified. For example, a user interface (e.g., display) of the UE may be used to indicate who (e.g., via e-mail address, telephone number, or other electronic identification) should receive the warning, what form the warning should be in (e-mail, text, phone call, etc.), whether the LAD should provide audio and/or visual indication when breach has occurred, and the like. Taking a picture may later help identify which asset (attached to a LAD) has breached the geo-fence. The one or more geo-fences, the picture of the asset, and/or the warning preferences account for the tracking information.

At block 410, the tracking information is transferred to the LAD that may be attached to an asset to be protected. In various embodiments the tracking information may include the geo-fence coordinates, a picture of the asset, and/or recipient(s) of the warning.

In one embodiment, at block 414, to conserve power, the LAD may enter and/or maintain a standby mode, where a substantial number of the components of the LAD are powered down. For example, components such as the GPS receiver, WiFi transceiver, display, radio access network transceiver, and most sensors are powered down. During this powered down mode, the accelerometer and/or the gyroscope are kept active to identify any potential movement. If movement is detected that exceeds a predetermined threshold, additional sensors, such as the GPS receiver, WiFi transceiver, etc., are turned ON to facilitate a determination of whether a geo-fence is crossed in step 418. Otherwise, the UE remains in standby mode.

At block 418, the LAD determines whether a geo-fence is crossed. The geo-fence can be crossed positively or negatively. If a geo-fence is not crossed ("no" at decision block 418), the UE returns to the standby mode. However, if the LAD determines that a geo-fence is crossed, ("yes" at decision block 418), the process continues with step 422. When a previous geolocation point was on one side of the geo-fence and the present location point is on the other side, the LAD can determine whether the geo-fence was crossed positively or negatively.

At step 422, upon determining that the geo-fence is crossed, the tracking information is sent to the warning sever via the radio access network 122 as an event notification. In one embodiment, the last location of the asset (e.g., GPS information on where the geo-fence was breached) is also sent to the warning server 130. In one embodiment if the LAD is moved along a perimeter of the geo-fence, to prevent multiple alerts being generated, there is a time threshold (e.g., 1 minute) between event notifications. In one embodiment, a live location feed of the LAD attached to the asset may also be streamed for the warning server 130 to track the immediate location of the LAD. The one or more geo-fences, the picture of the asset, and/or the warning preferences account for the tracking information.

At step 426, the warning server 130 generates a warning to an appropriate recipient. The recipient may be part of the tracking information provided by the LAD. In one embodiment, if the tracking information does not include information as to the recipient and the type of warning to generate (e.g., e-mail, text, phone call, etc.) the warning server contacts the CRM 150 to obtain the relevant information, which was previously stored in the CRM 150 as part of general preferences entered by the subscriber of the geo-fencing service. In various embodiments, the warnings may be suppressible. For example, the subscriber may specify one or more time intervals where crossing the geo-fence is acceptable. This information may be stored in the CRM 150 or provided as part of the tracking information.

As discussed above, in one embodiment, a separate UE is not required. Instead, the LAD is sophisticated enough to perform the functions of the UE, as it relates to establishing the tracking information. To that end, FIG. 5 illustrates a flow diagram of an example process for geo-fencing with an LAD without a separate UE. Some of the functionality discussed in process 500 is similar to that of process 400 and is therefore not discussed in detail for brevity.

At block 502, a geo-fence is created by the LAD. An application on the LAD is activated that is operative to determine a position of the LAD and record it in its memory.

At block 506, contextual information may be provided. For example, a picture may be taken of the asset to be monitored by the LAD and/or warning preferences may be identified. The one or more geo-fences, the picture of the asset, and/or the warning preferences, account for the tracking information.

In various embodiments, the LAD may have a power save mode, where non-essential components are powered down to conserve power and/or extend the battery operation of the LAD. Accordingly, at block 514, the LAD may enter a standby mode, where a substantial number of the components of the LAD are powered down. If movement is detected, additional sensors, such as the GPS receiver, WiFi transceiver, etc., are turned ON, depending on the tracking technology used, to facilitate a determination of whether a geo-fence is crossed in step 518. Otherwise, the LAD remains in standby mode.

At block 518, the LAD determines whether a geo-fence is crossed. If a geo-fence is not crossed ("no" at decision block 518), the UE returns to the standby mode. However, if the LAD determines that a geo-fence is crossed, either positively or negatively, ("yes" at decision block 518), the process continues with step 522.

At step 522, upon determining that the geo-fence is crossed, the tracking information is sent to the warning sever via the radio access network 122 as an event notification. In one embodiment, the last location of the asset (e.g., GPS information on where the geo-fence was breached) is also sent to the warning server 130. A live location feed of the LAD attached to the asset may also be streamed for the warning server 130 to track the location of the LAD (e.g., attached to the asset).

At step 526, the warning server 130 generates a warning to an appropriate recipient. The recipient may be part of the event notification provided by the LAD. In one embodiment, if the tracking information does not include information as to the recipient and the type of warning to generate (e.g., e-mail, text, phone call, etc.) the warning server contacts the CRM 150 to obtain the relevant information, which was previously stored in the CRM 150 as part of general preferences.

Example Computer Platform

As discussed above, functions relating to geo-fencing and providing warnings when a geo-fence is crossed can be performed on one or more computers connected for data communication via the components of a radio access network 122, including UE (102a, 102b, and 300), warning server 130, and CRM 150, as shown in FIG. 1 and in accordance with the process of FIGS. 4 and 5. An exemplary UE 300 has been discussed above with respect to FIG. 3. Although special purpose devices may be used as the server(s), such as servers 130 and 150 in FIG. 1, such devices also may be implemented using one or more hardware platforms intended to represent a general class of data processing device commonly used to run "server" programming so as to implement the functions discussed above, albeit with an appropriate network connection for data communication.

Figure 6:
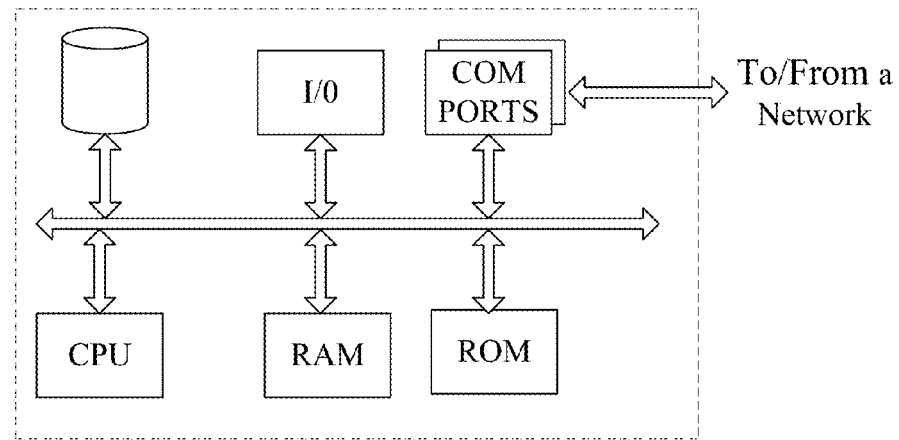
FIG. 6 illustrates a network or host computer.
Figure 7:
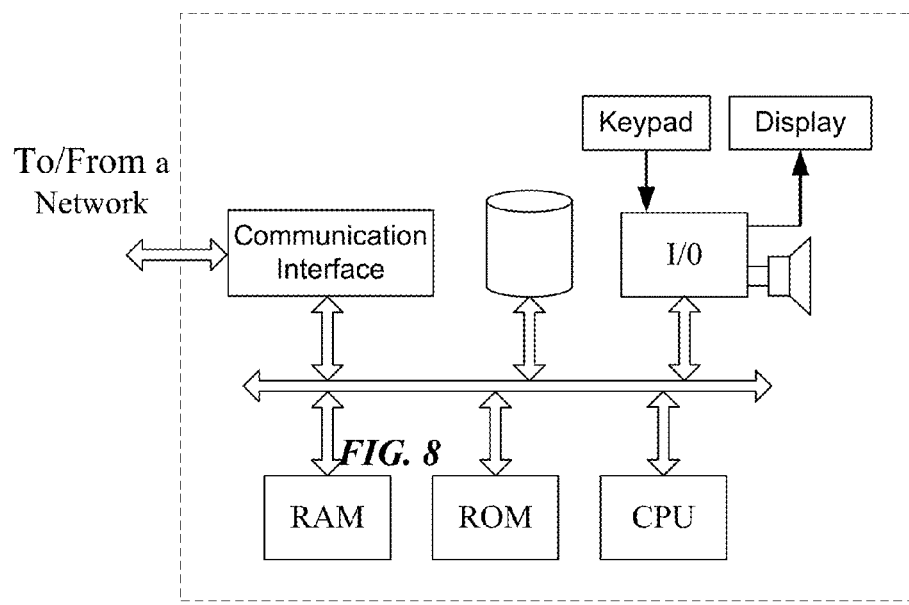
FIG. 7 illustrates a computer with user interface elements.

FIGS. 6 and 7 provide functional block diagram illustrations of general purpose computer hardware platforms. FIG. 6 illustrates a network or host computer platform, as may typically be used to implement a server, such as the warning server 130 or the CRM 150. FIG. 7 depicts a device with user interface elements, as may be used to implement a personal computer or a workstation, or to implement a computing device, such as a portable handset, a smartphone, tablet computer, a personal digital assistant or other type of UE or LAD of FIG. 1, although the device of FIG. 7 may also act as a server if appropriately programmed. It is believed that the general structure and general operation of such equipment as shown in FIGS. 6 and 7 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In various other embodiments, the functionality of the warning server 130 and CRM 150 may be combined in one or more server platforms.

The software functionalities involve programming, including executable code as well as associated stored data, e.g., files used for applications on the computing device to create a geo-fence and to determine a breach thereof. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of retrieving information, analyzing the information, storing the information, etc., in essentially the manner performed in the implementations discussed and illustrated herein.

Hence, aspects of the methods of receiving and processing data as outlined above may be embodied in programming. Program aspects of the technology may be thought of as "products" or "articles of manufacture" typically in the form of executable code and/or associated data that is carried on or embodied in a type of non-transitory machine readable medium.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the processes disclosed in FIGS. 4 and 5 are illustrations of exemplary approaches. Based upon design preferences, it is understood that the specific order or hierarchy of steps in the processes may be rearranged, expanded, and some steps omitted. Some of the blocks may be performed simultaneously. For example, the action of transferring a picture of the asset to the LAD may performed before, after, or at the same time as transferring the geo-fence coordinates. In another example, the block of taking a picture of the asset may be removed altogether.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device, comprising:
a processor;
a network interface coupled to the processor configured to enable communications via a radio access network;
a storage device for content and programming;
at least one sensor element;

a program stored in the storage device, wherein execution of the program by the processor configures the computing device to perform acts comprising:
  receiving location coordinates from a user equipment (UE) for a geo-fence, wherein the location coordinates are defined by the UE by recording a movement of the UE around a perimeter of an area;
  upon determining, by the at least one sensor, that the computing device crossed the geo-fence,
    determining a time and a location of where the geo-fence was crossed; and
    sending a notification to a warning server operative to trigger a warning message to one or more recipients, wherein the notification comprises:
      the location coordinates of the geo-fence; and
      the time and the location of where the geo-fence was crossed.

2. The computing device of claim 1, wherein execution of the program further configures the computing device to perform acts comprising:
  recording a picture of an asset to be protected by the geo-fence; and
  including the picture in the notification to the warning server.

3. The computing device of claim 1, wherein the geo-fence is three dimensional.

4. The computing device of claim 1, wherein the at least one sensor element includes a Global Positioning System (GPS) receiver that is used for the determination that the computing device crossed the geo-fence.

5. The computing device of claim 1, wherein the at least one sensor element includes a WiFi receiver that is used for the determination that the computing device crossed the geo-fence.

6. The computing device of claim 1, wherein the at least one sensor performs at least one of cellular triangulation and multilateration for the determination that the computing device crossed the geo-fence.

7. The computing device of claim 1, wherein the sending of the location coordinates of the notification to the warning server is via the radio access network.

8. The computing device of claim 1, wherein:
  the at least one sensor includes at least one of (i) an accelerometer, and (ii) a gyroscope, and
  execution of the program further configures the computing device to perform acts comprising maintaining a low power standby mode until at least one of (i) the accelerometer and (ii) the gyroscope determine a motion above a predetermined threshold.

9. A computing device, comprising:
a processor;
a network interface coupled to the processor configured to enable communications via a radio access network;
a storage device for content and programming;
at least one sensor element;
a program stored in the storage device, wherein execution of the program by the processor configures the computing device to perform acts comprising:
  defining a geo-fence for an asset by tracking location coordinates of the computing device with the at least one sensor element by recording a movement of the computing device around a perimeter of an area;
  upon determining, by the at least one sensor, that the computing device crossed the geo-fence,
    determining a time and a location of where the geo-fence was crossed; and
    sending a notification to a warning server operative to trigger a warning message to one or more recipients, wherein the notification comprises:
      the location coordinates of the geo-fence; and
      the time and the location of where the geo-fence was crossed.

10. The computing device of claim 9, wherein execution of the program further configures the computing device to perform acts comprising:
  recording a picture of an asset to be protected by the geo-fence; and
  including the picture in the notification to the warning server.

11. The computing device of claim 9, wherein the geo-fence is three dimensional.

12. The computing device of claim 9, wherein the at least one sensor element includes a Global Positioning System (GPS) receiver that is used for the determination that the computing device crossed the geo-fence.

13. The computing device of claim 9, wherein the at least one sensor element includes a WiFi receiver that is used for the determination that the computing device crossed the geo-fence.

14. The computing device of claim 9, wherein the at least one sensor performs at least one of cellular triangulation and multilateration for the determination that the computing device crossed the geo-fence.

15. The computing device of claim 9, wherein the transferring of the location coordinates of the notification to the warning server is via the radio access network.

16. The computing device of claim 9, wherein:
  the at least one sensor includes at least one of (i) an accelerometer, and (ii) a gyroscope, and
  execution of the program further configures the computing device to perform acts comprising maintaining a low power standby mode until at least one of the accelerometer and the gyroscope determine a motion above a predetermined threshold.

* * * * *